(12) United States Patent
Kobayashi et al.

(10) Patent No.: US 9,921,575 B2
(45) Date of Patent: Mar. 20, 2018

(54) PROCESS MONITORING SYSTEM, APPARATUS AND METHOD

(71) Applicant: YOKOGAWA ELECTRIC CORPORATION, Musashino, Tokyo (JP)

(72) Inventors: Satoshi Kobayashi, Musashino (JP); Kimikazu Takahashi, Musashino (JP); Mihoko Tanaka, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 539 days.

(21) Appl. No.: 13/903,394

(22) Filed: May 28, 2013

(65) Prior Publication Data

US 2013/0325158 A1    Dec. 5, 2013

(30) Foreign Application Priority Data

May 31, 2012    (JP) ................................ 2012-123948

(51) Int. Cl.
*G06F 19/00*    (2011.01)
*G05B 19/418*    (2006.01)
*G05B 23/02*    (2006.01)

(52) U.S. Cl.
CPC ... *G05B 19/41875* (2013.01); *G05B 23/0243* (2013.01)

(58) Field of Classification Search
CPC .... G05B 15/02; G05B 13/02; G05B 23/0283; G05B 23/0286; G05B 19/41875; G05B 13/048; G05B 2219/32194; G05B 2219/32201; G05B 23/0254; G05B 23/0267; G05B 23/0221; G05B 23/0232; G05B 23/0294

See application file for complete search history.

(56) References Cited

U.S. PATENT DOCUMENTS 5,226,118 A * 7/1993 Baker ................ G05B 23/0232
345/440
5,278,751 A * 1/1994 Adiano .................. G06Q 10/06
705/7.32

(Continued)

FOREIGN PATENT DOCUMENTS

CN    101464685 A    6/2009
CN    101711120 A    5/2010

(Continued)

*Primary Examiner* — Darrin Dunn
(74) *Attorney, Agent, or Firm* — Westerman, Hattori, Daniels & Adrian, LLP

(57) ABSTRACT

A process monitoring system includes: a plurality of field devices configured to measure state quantities in an industrial process implemented in a plant; a trend calculation unit configured to determine the variation trend of the state quantities based on time-sequence data output from each of the plurality of field devices and classify each of the variation trends of the state quantities into one of a pre-established plurality of statuses; a state change judgment unit configured to judge the existence or non-existence of a pre-indicator of a change in the plant state, in accordance with the existence or non-existence of a change in at least one of the statuses classified by the trend calculation unit; and a notification unit configured to notify of judgment results of the state change judgment unit.

22 Claims, 13 Drawing Sheets

(56) References Cited

U.S. PATENT DOCUMENTS

| | | | | |
|---|---|---|---|---|
| 5,561,610 | A * | 10/1996 | Schricker | G01D 3/08 340/679 |
| 5,859,885 | A * | 1/1999 | Rusnica | G05B 23/0272 340/525 |
| 6,466,935 | B1 * | 10/2002 | Stuart | G05B 19/41865 |
| 6,577,323 | B1 * | 6/2003 | Jamieson | G05B 23/0232 345/440 |
| 6,591,182 | B1 * | 7/2003 | Cece | F02C 9/00 477/30 |
| 6,629,095 | B1 * | 9/2003 | Wagstaff | G06F 17/30595 |
| 6,957,110 | B2 * | 10/2005 | Wewalaarachchi | G05B 15/02 700/17 |
| 7,233,882 | B2 * | 6/2007 | Srinivasan | G05B 23/021 700/28 |
| 7,315,851 | B2 * | 1/2008 | Cheng | G06Q 10/06 |
| 7,529,790 | B1 * | 5/2009 | Sayal | G06F 17/18 708/422 |
| 8,956,292 | B2 * | 2/2015 | Wekell | A61B 5/02055 600/301 |
| 9,041,730 | B2 * | 5/2015 | Johnson | A61B 5/14532 345/428 |
| 9,697,470 | B2 * | 7/2017 | Iskandar | G06N 5/048 |
| 2003/0056156 | A1 * | 3/2003 | Sauvage | G06F 11/3447 714/47.2 |
| 2004/0030524 | A1 * | 2/2004 | Jarrell | G05B 23/0283 702/113 |
| 2005/0131573 | A1 * | 6/2005 | You | G05B 19/4065 700/175 |
| 2005/0165519 | A1 * | 7/2005 | Ariyur | G05B 23/0232 702/190 |
| 2005/0165520 | A1 * | 7/2005 | Ariyur | G05B 23/0232 702/190 |
| 2006/0036403 | A1 * | 2/2006 | Wegerich | G05B 23/0254 702/183 |
| 2006/0058898 | A1 * | 3/2006 | Emigholz | C10G 11/187 700/29 |
| 2006/0189851 | A1 * | 8/2006 | Tivig | A61B 5/0205 600/300 |
| 2007/0106637 | A1 * | 5/2007 | Mostl | G06F 17/30418 |
| 2008/0233523 | A1 * | 9/2008 | Diepenbroek | F23G 5/50 431/14 |
| 2008/0243328 | A1 * | 10/2008 | Yu | G05B 23/0232 701/31.2 |
| 2008/0270071 | A1 * | 10/2008 | Marvasti | G05B 23/0221 702/179 |
| 2008/0276137 | A1 * | 11/2008 | Lin | G05B 23/0267 714/57 |
| 2008/0287755 | A1 | 11/2008 | Sass et al. | |
| 2009/0149981 | A1 * | 6/2009 | Evans | G05B 23/0254 700/110 |
| 2009/0164933 | A1 | 6/2009 | Pederson et al. | |
| 2010/0114810 | A1 * | 5/2010 | Hoyte | G05B 23/0294 706/47 |
| 2010/0161275 | A1 * | 6/2010 | Mousavi | G06Q 10/06 702/179 |
| 2010/0175015 | A1 * | 7/2010 | Lagnelov | G06Q 10/06 715/771 |
| 2011/0010662 | A1 * | 1/2011 | Zhang | G05B 23/0232 715/806 |
| 2011/0082694 | A1 * | 4/2011 | Fastow | G06K 9/00979 704/231 |
| 2011/0087616 | A1 * | 4/2011 | Strong, Jr. | G06Q 40/06 705/36 R |
| 2011/0119029 | A1 * | 5/2011 | Marvasti | G05B 23/0221 702/179 |
| 2011/0137432 | A1 * | 6/2011 | Wang | G05B 23/0232 700/79 |
| 2011/0191002 | A1 * | 8/2011 | Whatley | F02D 41/22 701/99 |
| 2011/0201911 | A1 * | 8/2011 | Johnson | A61B 5/14532 600/365 |
| 2011/0320388 | A1 * | 12/2011 | Wong | G05B 23/0278 706/12 |
| 2012/0123583 | A1 * | 5/2012 | Hazen | G05B 23/0221 700/110 |
| 2012/0265323 | A1 * | 10/2012 | Sentgeorge | C07K 14/32 700/29 |
| 2012/0266094 | A1 * | 10/2012 | Starr | H04L 41/22 715/771 |
| 2013/0041626 | A1 * | 2/2013 | Civil | G06Q 10/0639 702/179 |
| 2013/0066906 | A1 * | 3/2013 | Masuko | G06F 17/30241 707/769 |
| 2014/0135947 | A1 * | 5/2014 | Friman | G05B 23/0267 700/29 |

FOREIGN PATENT DOCUMENTS

| | | | |
|---|---|---|---|
| CN | 102158527 A | | 8/2011 |
| CN | 102282552 A | | 12/2011 |
| JP | 01-287419 A | | 11/1989 |
| JP | 06-195578 A | | 7/1994 |
| JP | 06-273286 A | | 9/1994 |
| JP | 6-273286 A | | 9/1994 |
| JP | 2001-084035 A | | 3/2001 |
| JP | 4483111 B2 | | 6/2010 |
| WO | WO 0060424 A1 * | 10/2000 | G05B 23/0272 |

* cited by examiner

FIG. 7A

| PRESSURE | TEMPERATURE | LEVEL | PLANT STATE |
|---|---|---|---|
| GRADUAL INCREASE | GRADUAL INCREASE | GRADUAL DECREASE | PRE-INDICATOR OF CHANGE EXISTS |
| GRADUAL INCREASE | GRADUAL DECREASE | — | PRE-INDICATOR OF CHANGE EXISTS |
| GRADUAL DECREASE | GRADUAL DECREASE | — | HEALTHY |

FIG. 7B

| PRESSURE | TEMPERATURE | LEVEL | PLANT STATE |
|---|---|---|---|
| GRADUAL INCREASE + CURRENT VALUE LOWER PART | GRADUAL INCREASE + CURRENT VALUE LOWER PART | GRADUAL DECREASE + CURRENT VALUE UPPER PART | HEALTHY |
| GRADUAL INCREASE + CURRENT VALUE UPPER PART | GRADUAL INCREASE | GRADUAL DECREASE | PRE-INDICATOR OF CHANGE EXISTS |
| GRADUAL INCREASE | GRADUAL INCREASE + CURRENT VALUE UPPER PART | GRADUAL DECREASE | PRE-INDICATOR OF CHANGE EXISTS |
| GRADUAL INCREASE | GRADUAL INCREASE | GRADUAL DECREASE + CURRENT VALUE LOWER PART | PRE-INDICATOR OF CHANGE EXISTS |

FIG. 7C

| OPERATING MODE | PRESSURE | TEMPERATURE | LEVEL | PLANT STATE |
|---|---|---|---|---|
| NORMAL MODE | GRADUAL INCREASE | GRADUAL INCREASE | (NO ALARM) | PRE-INDICATOR OF CHANGE EXISTS |
| TEMPERATURE RISE MODE | GRADUAL INCREASE | GRADUAL DECREASE | (NO ALARM) | HEALTHY |
| TEMPERATURE RISE MODE | GRADUAL INCREASE | CONSTANT (NO CHANGE) | (NO ALARM) | PRE-INDICATOR OF CHANGE EXISTS |
| TEMPERATURE RISE MODE | SUDDEN INCREASE | GRADUAL INCREASE | (NO ALARM) | PRE-INDICATOR OF CHANGE EXISTS |

FIG. 9A
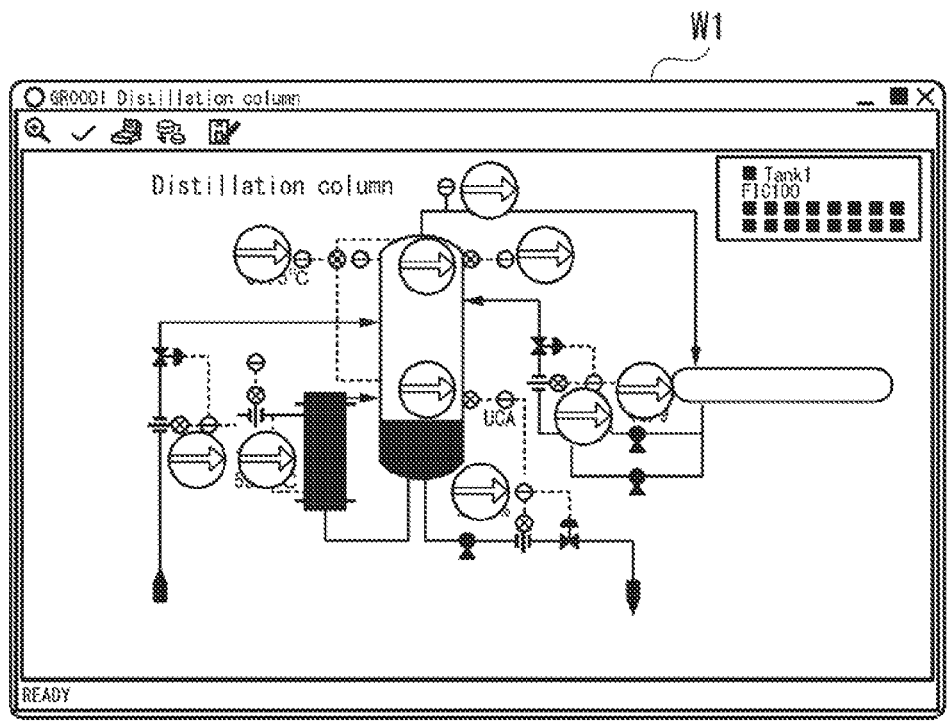
FIG. 9B     FIG. 9C     FIG. 9D
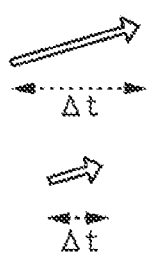
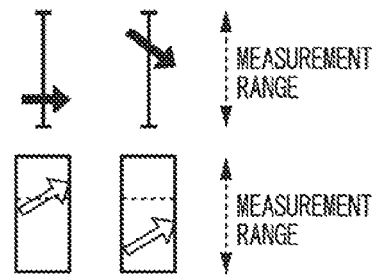

PROCESS MONITORING SYSTEM, APPARATUS AND METHOD

BACKGROUND OF THE INVENTION

Field of Art

The present invention relates to a process monitoring system, apparatus, and method.

The present application claims priority based on Japanese patent application No. 2012-123948, filed on May 31, 2012, the content of which is incorporated herein by reference.

Background Art

As will be made clear by citing patents, patent applications, patent publications, scientific references, and the like, the content thereof is incorporated herein for the purpose of better describing the prior art relative to the present.

Conventionally, in plants, factories, and the like, a process monitoring system is implemented for monitoring various state quantities (for example, pressure, temperature, and flow amount) in an industrial process. A high level of automated operation is achieved, based on the monitoring results of the process monitoring system. This process monitoring system is generally constituted by on-site devices (measuring instruments and actuators) known as field devices, a controller that controls them, and a process monitoring apparatus that monitors state quantities.

The above-noted process monitoring apparatus collects measurement results (information indicating various state quantities) of the field devices obtained by the controller. The process monitoring apparatus then displays a graph (trend graph) indicating the current values and time variations of the state quantities measured by one or more specific field device. The process monitoring apparatus, in addition to the current values and trend graphs of state quantities, displays thresholds (upper and lower thresholds) with respect to the state quantities. The process monitoring apparatus also generates an alarm to notify of an abnormality when a state quantity exceeds a threshold.

Japanese Patent No. 4483111 and Japanese Unexamined Patent Application, First Publication No. H1-287419 disclose conventional process monitoring apparatuses to monitor a process. Specifically, Japanese Patent No. 4483111 discloses a process monitoring apparatuses that monitors a trend of gradual state variation in a plant by performing statistical processing with respect to time-sequence process data. Japanese Unexamined Patent Application, First Publication No. H1-287419 discloses a process monitoring apparatus that judges a variation trend of a process variable such as temperature, pressure, or flow amount (increasing trend, decreasing trend, oscillation, or the like) and displays the result of the judgment.

In recent years, efforts are being made to digitalize and impart intelligence to the above-described field devices, and it has become possible to collect a large amount of diverse information from field devices. With the ability to collect such a large amount of diverse information, because the amount of information required for process control becomes large, process control that is more accurate and more efficient than conventionally can be implemented. When the collected information becomes diverse and increases in quantity, however, along with an increase in the number of items to be monitored by plant operators, the scope of the monitoring broadens, as does the burden on operators.

To achieve process control that is both accurate and efficient, it is necessary to grasp fine variations in state quantities as quickly as possible. In addition, in order to improve the overall production efficiency in a plant or the like, it is insufficient to only control so as to achieve the optimum state in a part of the process steps, and it is necessary to implement high-level control that considers the states in upstream and downstream process steps relative to a particular process step. Conventionally, because an operator referred to the current values and trend graphs of state quantities to judge the state of the plant, unless the operator is sufficiently experienced, fine variations in state quantities are overlooked, making it difficult to achieve a highly efficient process.

If the art disclosed in the above-described Japanese Patent No. 4483111 and Japanese Unexamined Patent Application, First Publication No. H1-287419 is used, an operator not having a high level of experience can be aided to some extent. However, because an operator must make the ultimate judgment of the state of the plant, the achievement of a high-efficiency process still requires an operator with a high level of experience. Additionally, in a situation in which the information obtained from field devices becomes diverse and increases in quantity, the burden on even a highly experienced operator increases, bringing conventional monitoring methods close to their limit.

SUMMARY OF THE INVENTION

The present invention provides a process monitoring system, apparatus, and method that lower the burden on an operator, while being able to provide information useful for implementing highly accurate and highly efficient process control, even if the information obtained from a plant becomes diverse and large in quantity.

A first aspect of the present invention is a process monitoring system including: a plurality of field devices configured to measure state quantities in an industrial process implemented in a plant; a trend calculation unit configured to determine the variation trend of the state quantities, based on time-sequence data output from each of the plurality of field devices, and classify each of the variation trends of the state quantities into one of a pre-established plurality of statuses; a state change judgment unit configured to judge the existence or non-existence of a pre-indicator of a change in the plant state, in accordance with the existence or non-existence of a change in at least one of the statuses classified by the trend calculation unit; and a notification unit configured to notify of judgment results of the state change judgment unit.

According to the first aspect of the present invention, a state quantity variation trend is determined and the status is classified, based on time-sequence data output from each field device and the existence or non-existence a pre-indicator of a change in the plant state is judged, in accordance with the existence or non-existence of a change in at least one status of the classified statuses, notification being made of the judgment result.

The state change judgment unit may be configured to judge that a pre-indicator of a change in the state of the plant exists, when the state change judgment unit recognizes the change of at least one of the statuses regarding a plurality of state quantities pre-specified among the state quantities.

The state change judgment unit may be configured to judge the existence or non-existence of a pre-indicator of a change in the plant state, with reference to at least one of: the current values of the state quantities; and a plant operating state in addition to the existence or non-existence of a change in the status.

The state change judgment unit may be configured to judge the existence or non-existence of a pre-indicator that a plant state will change, the judgment being made using a table that sets forth a relationship between combinations of the statuses regarding the pre-established plurality of state quantities and plant states.

The notification unit may include a display device configured to display the status classified by the trend calculation unit in addition to the judgment results of the state change judgment unit.

The process monitoring system may further include a data extraction unit configured to extract data related to a state quantity exhibiting a change of status as a basis for the judgment, in case that the state change judgment unit makes a judgment that there is a pre-indicator that the plant state will change.

The trend calculation unit may be configured to determine a variation trend of each state quantity, by determining the slope of time-sequence data output from each of the plurality of field devices.

The length of the time period for determining a slope of the time-sequence data may differ depending upon the type of state quantity.

The trend calculation unit may be configured to determine the variation trend of each state quantity, by using at least one of: a process to determine a piecewise moving average; a process to determine a linear approximation by the least squares method; and a statistical process to determine the standard deviation or variance.

The state quantity may indicate a characteristic of at least one of odor, flame shape, and smoke color.

The data extraction unit may be configured to extract data related to apparatuses positioned in at least an upstream process and a downstream process relative to the field device having measured a state quantity that has exhibited the status change.

The trend calculation unit may be configured to classify each status of the plurality of statuses into any one of: a first status indicating that the variation trend of the state quantity is constant; a second status indicating that the variation trend of the state quantity is a trend of increase; and a third status indicating that the variation trend of the state quantity is a trend of decrease.

The display device may be configured to display the status classified by the trend calculation unit in association with an outer appearance of an apparatus to be provided in the plant.

The display device may be configured to display an arrow having the magnitude of slope angle which represents a type of the status.

The display device may be configured to display the arrow having a length that represents a time interval to be used for determining the variation trend.

The display device may be configured to display the arrow having a position in a measurement range, the position representing a current value of the state quantity.

The display device may be configured to display a radar chart representing the status classified by the trend calculation unit.

The trend calculation unit may be configured to determine a further variation trend to each of the trend variations of the state quantities, the determination being made based on time-sequence data output from each device of the plurality of field devices.

A second aspect of the present invention is a process monitoring apparatus including: a trend calculation unit configured to determine each variation trend of the state quantities and classify each of the variation trends of the state quantities into one status of a pre-established plurality of statuses, the determination being made based on time-sequence data output from each of a plurality of field devices for measuring the state quantities in an industrial process implemented in a plant; and a state change judgment unit configured to judge the existence or non-existence of a pre-indicator of a change in the state of the plant, the judgment being made in accordance with the existence or non-existence of a change in at least one status of statuses classified by the trend calculation unit.

A third aspect of the present invention is a process monitoring method including: collecting time-sequence data output from each of a plurality of field devices measuring state quantities in an industrial process implemented in a plant; determining a variation trend of the state quantities, and classifying the variation trends of the state quantities into one of a pre-established plurality of statuses, the determination being made based on the collected time-sequence data; judging the existence or non-existence of a pre-indicator of a change in the state of the plant in accordance with the existence or non-existence of a change in the state of at least one of the classified statuses; and notifying of the judgment results of the existence or non-existence of a pre-indicator of a change in the state of the plant.

BRIEF DESCRIPTIONS OF THE DRAWINGS

FIG. 7A is a first drawing showing an example of a pre-indicator judgment table in an embodiment of the present invention.

FIG. 7B is a second drawing showing an example of a pre-indicator judgment table in an embodiment of the present invention.

FIG. 7C is a third drawing showing an example of a pre-indicator judgment table in an embodiment of the present invention.

FIG. 9A is a first drawing showing an example of the display content of a monitoring terminal apparatus in an embodiment of the present invention.

FIG. 9B is a second drawing showing an example of the display content of a monitoring terminal apparatus in an embodiment of the present invention.

FIG. 9C is a third drawing showing an example of the display content of a monitoring terminal apparatus in an embodiment of the present invention.

FIG. 9D is a fourth drawing showing an example of the display content of a monitoring terminal apparatus in an embodiment of the present invention.

PREFERRED EMBODIMENTS

Embodiments of the present invention are described below, with references made to the drawings. In the description of the embodiments to follow, the invention and equivalents thereto set forth in the attached claims are simply described as examples, and it will be clear to a person skilled in the art, based on the present disclosure, that these are not intended to be restrictive.

[Overall System Constitution]

Figure 1:
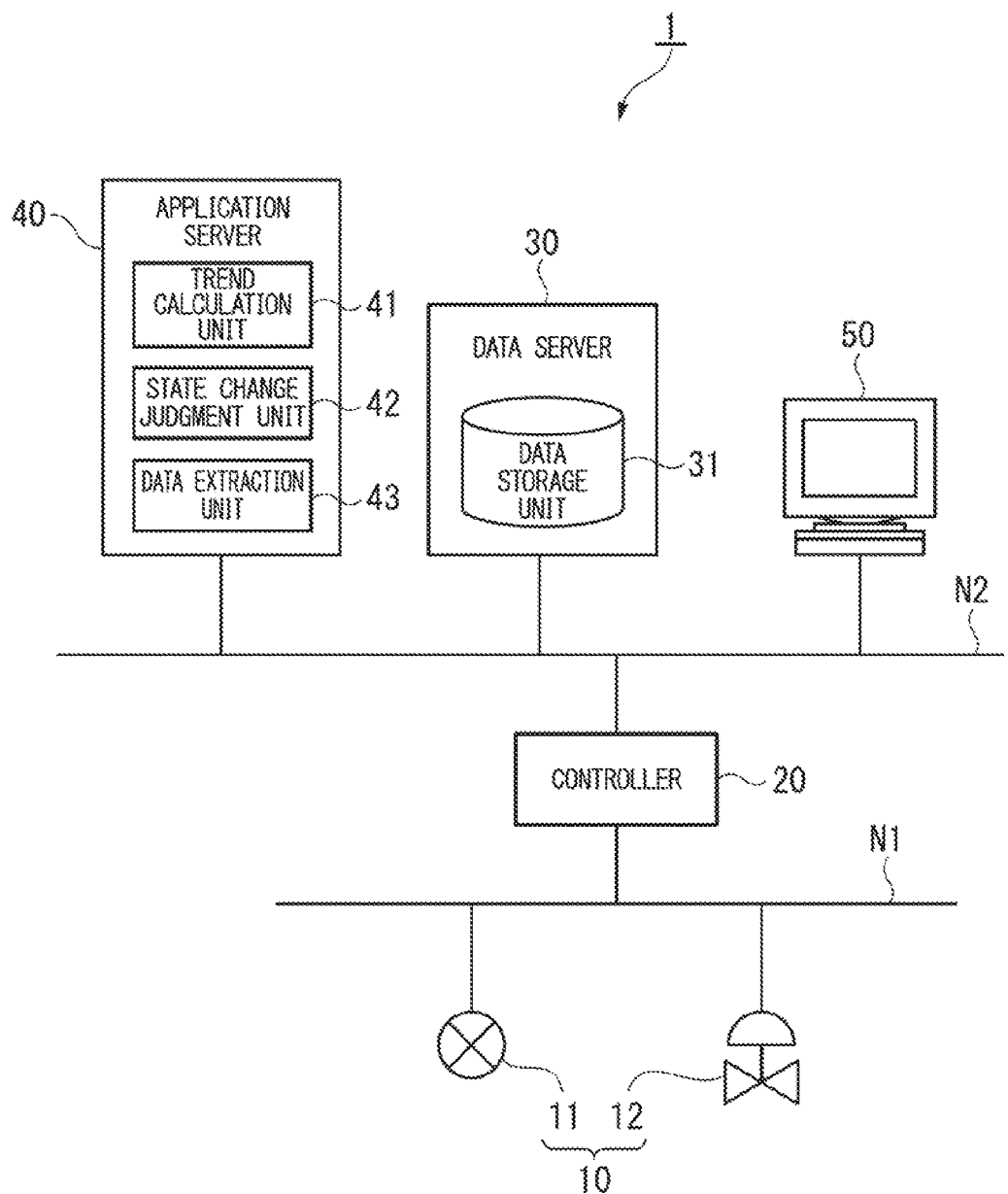
FIG. 1 is a block diagram showing the overall constitution of a process monitoring system according to an embodiment of the present invention.

FIG. 1 is a block diagram showing the overall constitution of a process monitoring system 1 according to an embodiment of the present invention. As shown in FIG. 1, the process monitoring system 1 of the present embodiment has field devices 10, a controller 20, a data server 30, an application server 40, and a monitoring terminal apparatus 50 (notification means, display device). The process monitoring system 1 monitors an industrial process implemented in a plant (not shown).

The field devices 10 and the controller 20 are connected to a field network N1. The controller 20, the data server 30, the application server 40, and the monitoring terminal apparatus 50 are connected to a control network N2. The field network N1 is, for example, a cable network laid throughout the plant. The control network N2 is, for example, a cable network connecting between on-site locations in the plant and a monitoring room. The field network N1 and the control network N2 may be wireless networks.

The field devices 10 are, for example, sensor devices such as flow gauges and temperature sensors, valve devices such as flow amount control valves and open/close values, actuator devices such as fans and motors, and other devices installed on-site in a plant. In FIG. 1, to facilitate understanding, of the field devices 10 installed in a plant, a sensor device 11 that measures the flow amount of a fluid and a valve device 12 that controls or manipulates the amount of flow of a fluid are illustrated.

The above-noted field devices 10 operate in accordance with the functions of field devices 10, under control of the controller 20. For example, the sensor device 11 transmits to the controller 20, via the field network N1, measurement data obtained by measuring the flow amount of a fluid, and the valve device 12 manipulates the flow amount of a fluid by adjusting the opening of a valve through which the fluid passes, under control of the controller 20.

The controller 20 controls the field devices 10 via the field network N1, and transmits to the data server 30, via the control network N2, various data obtained by controlling the field devices 10. For example, the controller 20 controls the sensor device 11 so as to obtain measurement data indicating the flow amount, and controls the valve device 12 in accordance with the obtained measurement data to adjust the opening of a valve. Also, measurement data obtained from the sensor device 11 and data based on the control data with respect to the valve device 12 are transmitted to the data server 30. If there is an instruction from the monitoring terminal apparatus 50, the controller 20, for example, controls the field devices 10 in response to the instruction.

The data transmitted from the controller 20 to the data server 30 is measurement data obtained from the above-noted sensor device 11 and arbitrary data based on the control data with respect to the valve device 12. The data transmitted from the controller 20 to the data server 30 is, for example, the following data (1) to (3).

(1) Measurement data successively obtained from the sensor device 11.

(2) Control data successively output to the valve device 12.

(3) Data that is calculated based on at least one data from a plurality of measurement data obtained from at least one sensor device and a plurality of control data output to at least one valve device.

The data server 30 has a data storage unit 31 that is implemented by, for example, a large-capacity hard disk. The data server 30 stores in the data storage unit 31 various data obtained by the process monitoring system 1 and, upon request, provides data stored in the data storage unit 31. For example, the data server 30 stores in the data storage unit 31 in time-sequence order data which are successively transmitted from the controller 20 (the data (1) to (3) of the above examples).

The application server 40 has a trend calculation unit 41, a state change judgment unit 42, and a data extraction unit 43. The application server 40, using various data stored in the data server 30, provides information useful to an operator in monitoring a process. Specifically, the application server 40 provides information indicating a variation trend of a state variable (for example, flow amount of a fluid) in an industrial process, information indicating the existence or non-existence of a pre-indicator of a change in the state of a plant, and information required to handle a change in the state of a plant.

The trend calculation unit 41, based on the time-sequence data (for example the above-noted data (1) to (3)) stored in the data server 30, determines variation trends of state quantities in the industrial process and classifies each of the determined state quantity variation trends into one status of a pre-established plurality of statuses. The classification of variation trends of state quantities into statuses is done because it makes it easy for an operator to grasp variation trends of state quantities, and because it makes it easy to accurately judge the state of the plant by the state change judgment unit 42 (judge whether or not there is a pre-indicator of a change in the plant state).

The state change judgment unit 42 judges the existence or non-existence of a pre-indicator of a change in the plant state, in accordance with the existence or non-existence of a change in the status classified by the trend calculation unit 41. For example, if at least one of the statuses classified by the trend calculation unit 41 changes, or at least one status of a pre-established plurality of statuses of a state quantity changes, the state change judgment unit 42 judges that there is a pre-indicator of a change in the state of the plant.

If the state change judgment unit 42 judges that there is a pre-indicator of a change in the state of the plant, the data extraction unit 43 extracts data associated with the state quantities in which a change of status has occurred, which are taken as the basis for the judgment. If there is a pre-indicator of a change in the state of the plant, it is necessary for the operator to take action so that the state of the plant does not change. Specifically, it is necessary for the operator to perform a series of tasks, such as grasping the state and identifying the problem point, considering proposed actions, executing a countermeasure, and verifying the state of the plant. Although it is desirable that the above-noted action proposal be directly indicated to the operator, at present this is difficult. For this reason, by extracting data related to the state quantities in which a status has changed, information is provided that will be necessary in taking action in the case of a change in the state of the plant.

The details of the processing performed by the trend calculation unit 41, the state change judgment unit 42, and the data extraction unit 43 will be described later.

The monitoring terminal apparatus 50 is implemented by, for example, a computer, and is operated by an operator for the purpose of monitoring a process. The monitoring terminal apparatus 50, in addition to displaying various information provided from the data server 30 and the application server 40, gives instructions to the controller 20 and the application server 40 responsive to operations by the operator. If a judgment is made by the application server 40 that there is a pre-indicator of a change in the state of the plant, the monitoring terminal apparatus 50 gives notification to that effect by an alarm or the like. Examples of alarms are a display (for example, a highlighted display), a voice, or vibration and the like to attract the attention of the operator. The details of the content displayed by the monitoring terminal apparatus 50 will be described later.

(System Operation)

Figure 2:
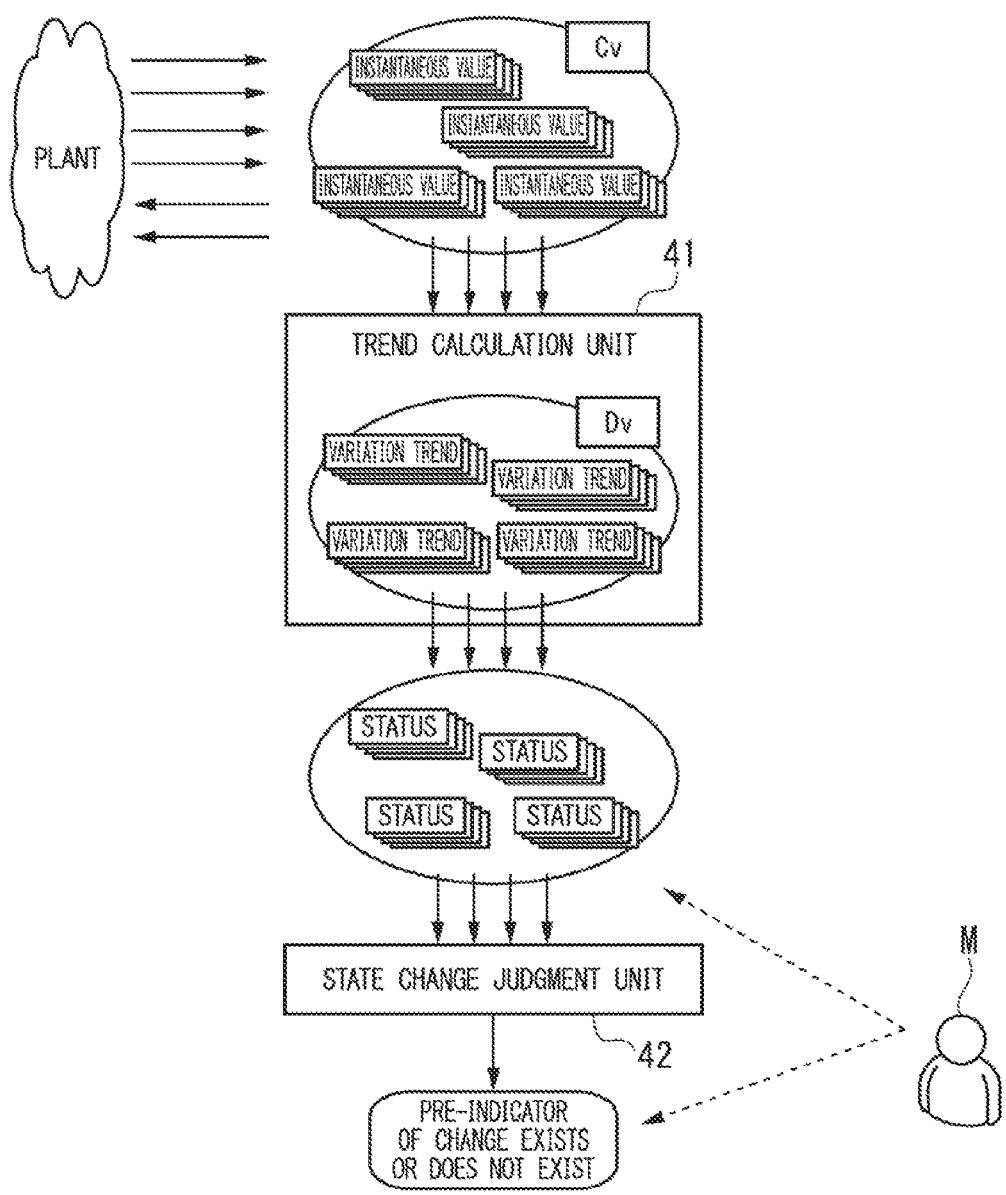
FIG. 2 is a drawing for generally describing the operation of the process monitoring system according to the embodiment of the present invention.
Figure 3:
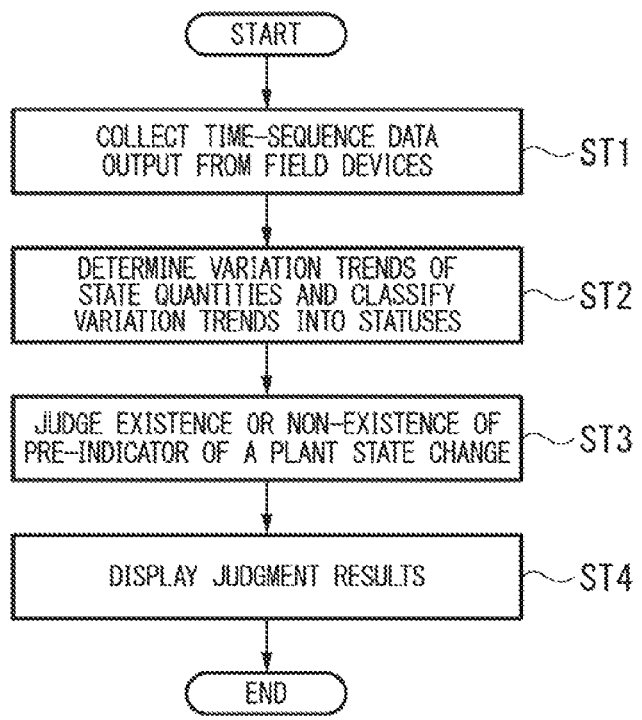
FIG. 3 is a flowchart showing a processing monitoring method according to an embodiment of the present invention.

Next, the operation of the process monitoring system 1 having the above-noted constitution will be described. FIG. 2 is a block diagram generally describing the operation of a process monitoring system according to an embodiment of the present invention. FIG. 3 is a flowchart showing the method of process monitoring by an embodiment of the present invention. As shown in FIG. 2 and FIG. 3, first measurements are performed of the state quantities in the industrial process implemented in the plant. Then, data based on the measurement results and the like (measurement data obtained from the sensor device 11 and data based on the control data with respect to the valve device 12) is stored into the data server 30 as the time-sequence data Cv (step ST1).

For example, a field device 10 (for example, the sensor device 11) measures the above-noted state quantity (for example the flow amount of a fluid), and the controller 20 successively collects the measurement data indicating the measurement results. The controller 20 also outputs control data to other field devices 10 (for example, the valve device 12). Data calculated based on the measurement data collected by the controller 20 and control data output from the controller 20 is transmitted to the data server 30 and stored as time-sequence data Cv in the data storage unit 31.

Next, based on the time-sequence data Cv stored in the data server 30, the variation trend Dv of the above-described state quantity in the industrial process is determined, and the determined variation trend Dv is into one of a pre-established plurality of statuses (step ST2). Specifically, a request by the application server 40 causes the readout of the time-sequence data Cv stored in the data storage unit 31 of the data server 30. The above-noted variation trend Dv is then determined by the trend calculation unit 41, and classification is done into a status corresponding to the value of the determined variation trend Dv.

When the above-noted processing is completed, the state change judgment unit 42 of the application server 40 judges the existence or non-existence of a pre-indicator of a change in the plant state (step ST3). For example, if at least one of the statuses of the statuses classified by the trend calculation unit 41 has changed, or if at least one of a pre-established plurality of statuses has changed, the state change judgment unit 42 judges that the state of the plant has changed.

The status determined by the trend calculation unit 41 and the judgment result of the state change judgment unit 42 are transmitted to the monitoring terminal apparatus 50 and displayed (step ST4). The operator M refers to the displayed content on the monitoring terminal apparatus 50 and makes the ultimate judgment as to whether or not there is a pre-indicator of a change in the state of the plant. If the ultimate judgment is made that the state of the plant will change, the operator performs a series of tasks of grasping the current state, identifying the problem point, considering proposed actions, executing a countermeasure, and verifying the state of the plant. By doing this, action is taken so that the state of the plant does not change. When taking the above-noted action, the operator uses the information provided by extraction by the data extraction unit 43 as a reference.

(Details of the Application Server)

Next, the details of the processing performed by the trend calculation unit 41, the state change judgment unit 42, and the data extraction unit 43 of the application server 40 will be described.

(Trend Calculation Unit 41)

As described above, the trend calculation unit 41 determines the variation trend Dv of a state quantity in an industrial process, based on the time-sequence data Cv. Specifically, the trend calculation unit 41 considers the variation with time of the time-sequence data Cv stored in the data server 30 and determines a variation trend Dv that is similar to a variation trend that could be visually sensed by a human. This is to enable subjective monitoring by an operator, who judges the existence or non-existence of a pre-indicator of a plant state change, by referring not to an instantaneous value of a state quantity, but to a graph (trend graph) showing the variation with time of the state quantity.

Figure 4:
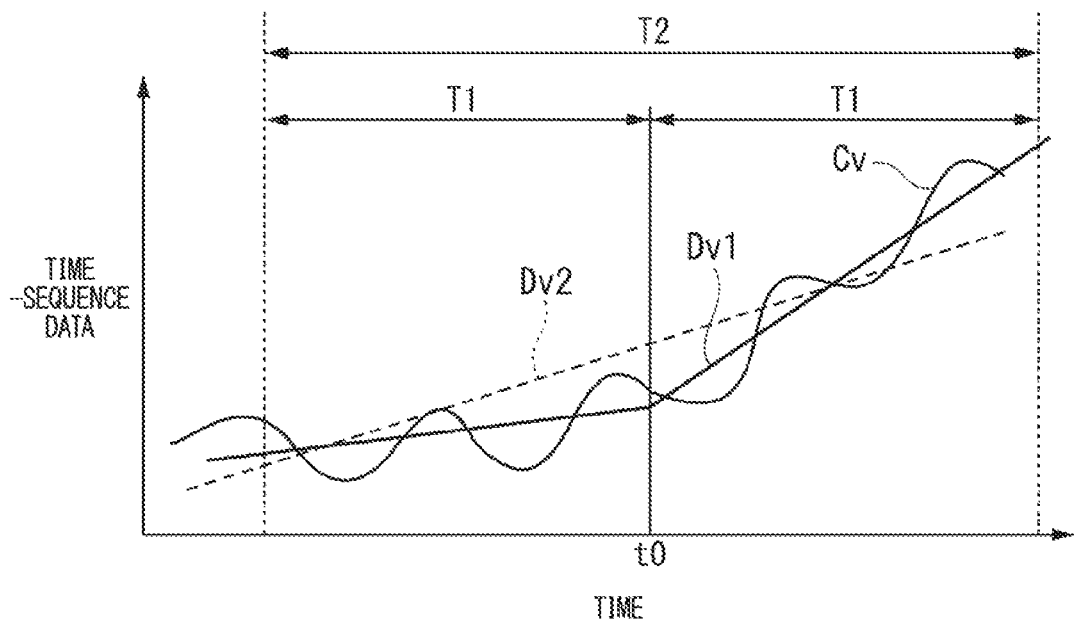
FIG. 4 is a drawing for describing the method of calculating a variation trend of a state variable in an embodiment of the present invention.

FIG. 4 is a drawing describing the method of calculating the variation trend of a state quantity in the embodiment of the present invention. Consider, in this case, as shown in FIG. 4, the time-sequence data Cv that not only varies in an oscillating manner with a short period, but also exhibits a change in the variation trend between before and after the time t0, which is of a degree that can be sensed visually by a human. The trend calculation unit 41, for example, determines the variation trend Dv of the time-sequence data Cv by performing processing to determine the slope of the time-sequence data Cv.

If the time period for determining the variation trend Dv of the time-sequence data Cv is set to the period T1 in FIG. 4, the variation trend Dv1 shown by the solid line in FIG. 4 is determined, there being a large change between before and after time t0, this being a variation trend similar to a variation trend that could be visually sensed by a human. In contrast, if the time period is set to the period T2, which is longer than the period T1 in FIG. 4, the variation trend Dv2 shown by the broken line in FIG. 4 is determined, so that there is absolutely no change between before and after time t0, this being completely different from a variation trend that could be visually sensed by a human.

In this manner, when determining the variation trend Dv of the time-sequence data Cv from the slope of the time-sequence data Cv, by adjusting the length of the time period for determining the slope, it is possible to determine a variation trend that is similar to a variation trend that could be visually sensed by a human. Because the appropriate time period for determining the slope differs, depending upon the various types of state quantities being measured, the length may be set to be different for each of the types of state quantities. In making these settings, the time period may be automatically set, giving consideration to control parameters (PID control parameters) set into the controller 20 for each of the state quantities.

The variation trend Dv of the time-sequence data Cv may be determined, in addition to processing to determine the slope of the time-sequence data Cv, by at least one of processing to determine the piecewise moving average, processing to determine a linear approximation by the least squares method, statistical processing to determine the standard deviation or variance or the like, and the processing disclosed in Japanese Patent No. 4483111. The variation trend Dv may be determined from not one time-sequence data Cv, but from a plurality of time-sequence data Cv.

As described above, the trend calculation unit 41 classifies a variation trend Dv of the time-sequence data Cv that has been determined by the above-noted processing into one of a pre-established plurality of statuses. For example, with regard to time-sequence data Cv indicating the flow amount of a fluid, the following six statuses are established: "Constant" which means the variation trend Dv is approximately zero; "Gradual increase" which means the variation trend Dv is a small positive value; "Gradual decrease" which means the variation trend Dv is a small negative value; "Sudden increase" which means the variation trend Dv is a large positive value; "Sudden decrease" which means the variation trend Dv is a large negative value; and "Undetermined" which means status that is none of the above.

The above classification can be performed for such difficult-to-quantify items as odor, flame shape, and smoke color. By classifying these, it is possible to make comparisons of difficult-to-quantify items such as odor, flame shape, and smoke color in the same manner as easy-to-quantify state quantities such as temperature, pressure, and flow amount. The above-noted classification may be done with respect to each individual state quantity, or alternatively may be done to consider collectively a plurality of state quantities.

(State Change Judgment Unit 42)

As described above, the state change judgment unit 42 judges the existence or non-existence of a pre-indicator of a plant state change in accordance with the existence or non-existence of a change in the status classified by the trend calculation unit 41. For example, if as shown in FIG. 5A to FIG. 5C, at least one of the statuses classified by the trend calculation unit 41 has changed, or at least one of a pre-established plurality of statuses of state quantities has changed, the state change judgment unit 42 judges that there is a pre-indicator that the state of the plant will change.

Figure 5A:
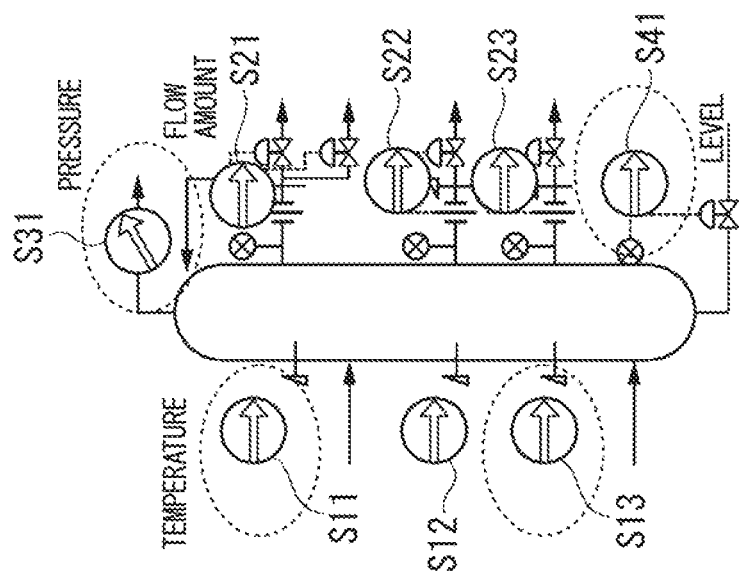
FIG. 5A is a first drawing for describing an example of the method of judging a pre-indicator that the plant state will change in an embodiment of the present invention.
Figure 5B:
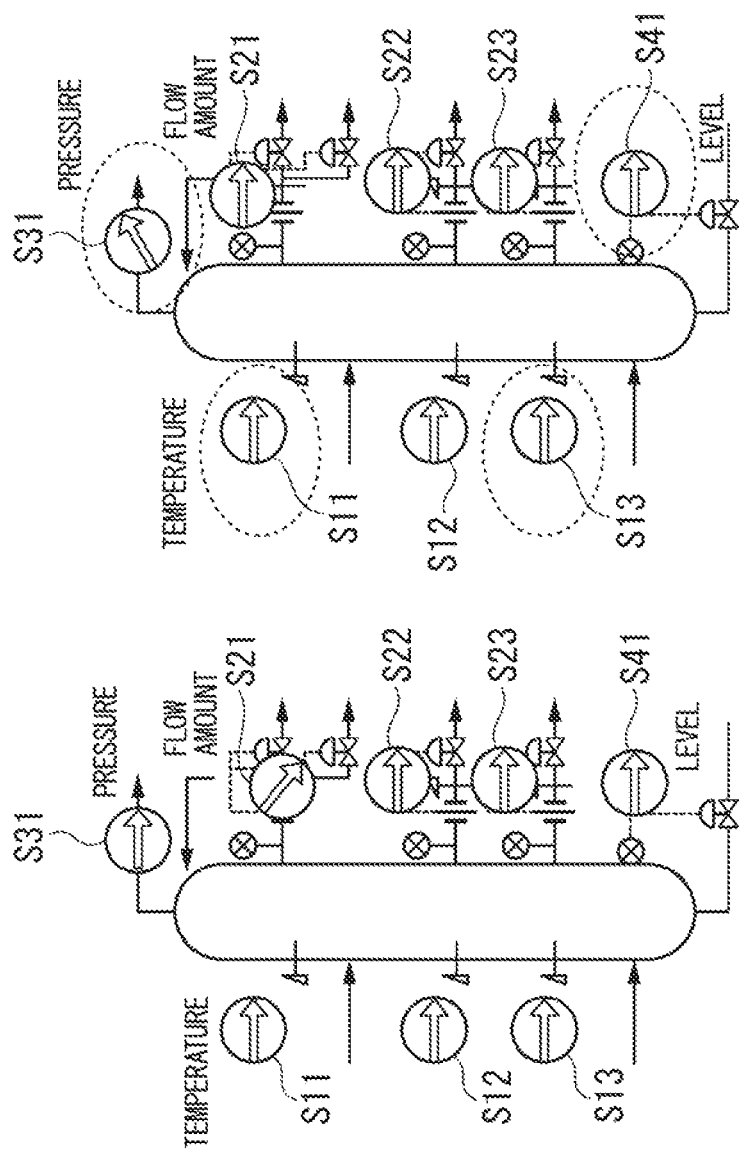
FIG. 5B is a second drawing for describing an example of the method of judging a pre-indicator that the plant state will change in an embodiment of the present invention.
Figure 5C:
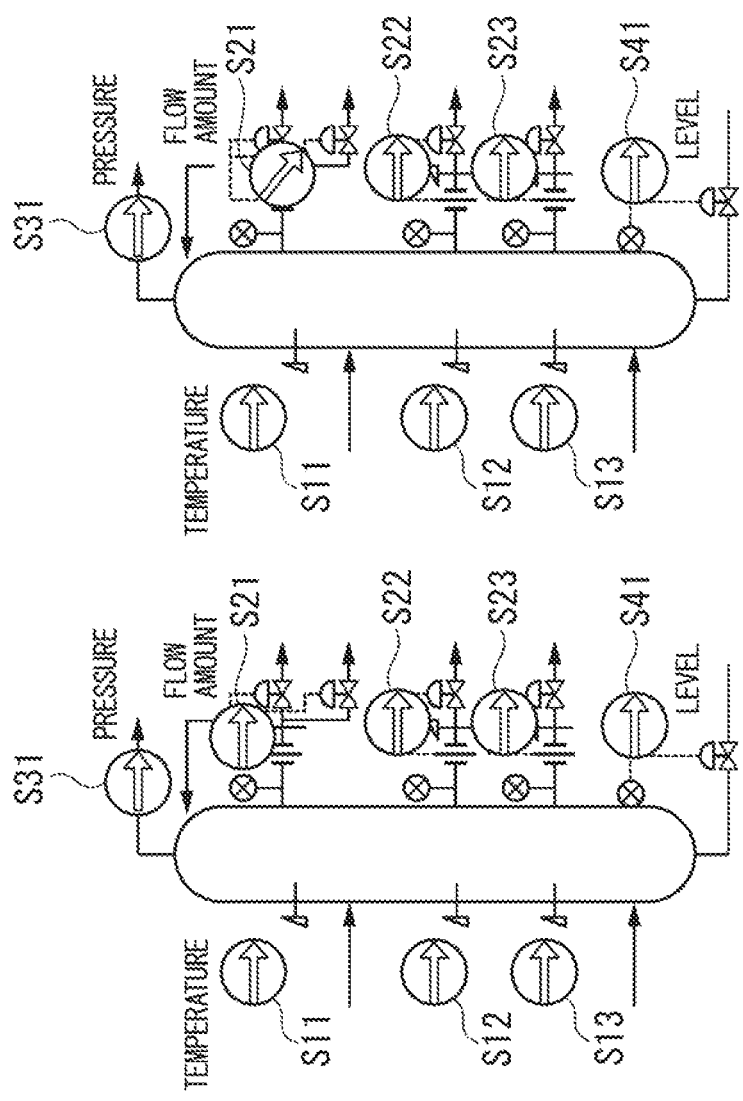
FIG. 5C is a third drawing for describing an example of the method of judging a pre-indicator that the plant state will change in an embodiment of the present invention.

FIG. 5A to FIG. 5C describe an example of the method of judging a pre-indicator of a change in the plant state in an embodiment of the present invention. To facilitate understanding, the description will use the example of a distillation column provided in a plant. This distillation column has three temperature sensors, three flow gauges, one pressure sensor, and one level sensor that measures the position of a fluid level. The statuses S11 to S13 are determined from the temperature sensor measurement results, the statuses S21 to S23 are determined from the flow gauge measurement results, the S31 status is determined from the pressure sensor measurement result, and the status S41 is determined from level sensor measurement result. In FIG. 5A to FIG. 5C, the status indicating the above-noted "constant" is represented by a right-directed arrow, the status indicating the above-noted "gradual decrease" is represented by an arrow directed to the lower right, and the status indicating the above-noted "gradual increase" is represented by an arrow directed to the upper right.

As shown in FIG. 5A, the case shown is the case in which, in the initial condition, the statuses S11 to S13, S21 to S23, S31, and S41 are all statuses indicating "constant." As shown in FIG. 5B, if one of the statuses S11 to S13, S21 to S23, S31, and S41 has changed to a status indicating "gradual decrease," the state change judgment unit 42 judges that there is a pre-indicator of a change in the plant state (distillation column state).

Alternatively, as shown in FIG. 5C, if, of the statuses S11 to S13, S21 to S23, S31, and S41, the statuses S11, S13, S31, and S41 are pre-established as statuses to watch, the state change judgment unit 42 makes the following judgment. Specifically, if the one status S31 of the statuses S11, S13, S31, and S41 changes to a status indicating "gradual increase," the state change judgment unit 42 judges that there is a pre-indicator of a change in the plant state (distillation column state).

Figure 6:
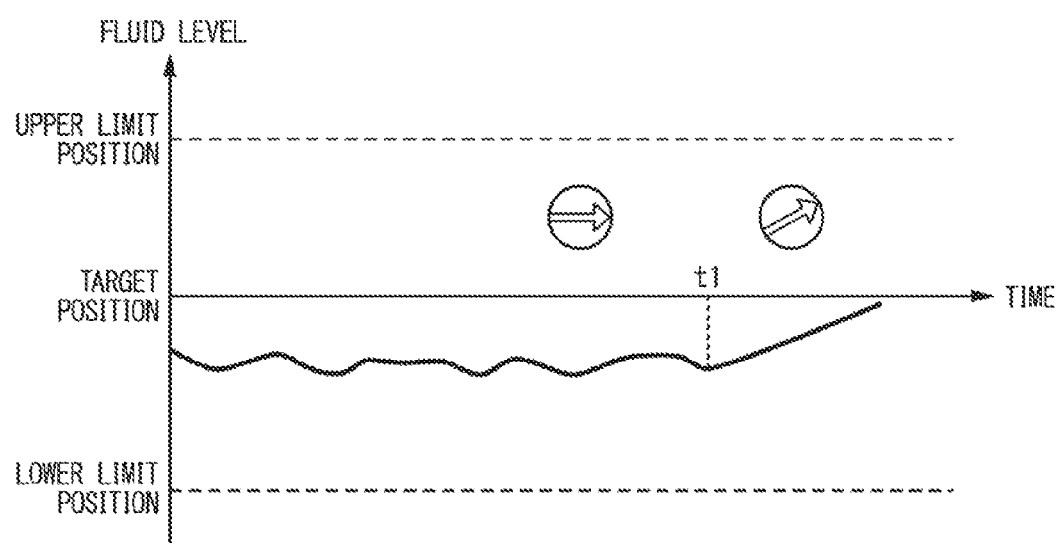
FIG. 6 is a drawing for describing another example of the method of judging a pre-indicator that the plant state will change in an embodiment of the present invention.

The state change judgment unit 42 may judge the existence or non-existence of a pre-indicator of a change in the state of the plant considering not only the existence or non-existence of a change in a status classified by the trend calculation unit 41, but also a state quantity current value or plant operating state. FIG. 6 describes another example of the method of judging a pre-indicator that the plant state will change in an embodiment of the present invention. In this case, the description will use the example of the status S41 (refer to FIG. 5A to FIG. 5C) determined from the measurement results from the level sensor measuring the fluid level.

As shown in FIG. 6, a target position, an upper limit position, and a lower limit position are set for the fluid level measured by the level sensor. The description will be for the case in which, as shown in FIG. 6, the fluid level varies with the passage of time within a range bounded by the upper limit position and the lower limit position. In this case, at time t1 in FIG. 6, even if the status S41 changes from a status indicating "constant" to a status indicating "gradual increase," the state change judgment unit 42 considers the fluid level position at time t1 and judges that there is no pre-indicator of a change in the plant state (distillation column state). This is because, immediately after time t1, the fluid level position is in a trend approaching the target position, and there is no need for an improvement based on an operator instruction.

A status often changes with a change in the operating condition of the plant. For example, if the set operating condition of the plant is change from a "static mode" in which the temperature of the above-described distillation column is maintained to a "temperature rise mode" which increases the temperature of the distillation column, or to a "temperature drop mode" which decreases the temperature of the distillation column, the statuses S11 to S13 (refer to FIG. 5A to FIG. 5C) determined from the temperature sensor measurement results change. In such cases as well, because there is no need for improvement by an operator instruction, the state change judgment unit 42 considers the plant operating state and judges that there is no pre-indicator of a change in the plant state (distillation column state).

If the state change judgment unit 42 judges the existence or non-existence of a pre-indicator that the plant state will change using a plurality of state quantity statuses, the judgment is made using a pre-indicator judgment table that establishes a relationship between combinations of pre-established plurality of statuses and plant states. FIG. 7A to FIG. 7C show examples of pre-indicator judgment tables in an embodiment of the present invention.

The pre-indicator judgment table shown in FIG. 7A sets forth the relationship between combinations of the statuses of pressure, temperature, and level (fluid level) and the plant state. For example, when the pressure and temperature statuses are "gradual increase" and the level status is "gradual decrease," the plant state is "change pre-indicator exists." In contrast, when the pressure and temperature statuses are "gradual decrease," the plant state is "healthy (no change pre-indicator)."

The pre-indicator judgment table shown in FIG. 7B is a table that adds the current value to the pre-indicator judgment table shown in FIG. 7A.

The pre-indicator judgment table shown in FIG. 7C is a table that adds the operating state (operating mode) of the plant to the pre-indicator judgment table shown in FIG. 7A. Using such pre-indicator judgment tables facilitates judgment of the existence or non-existence of a pre-indicator that the plant state. If an operator makes a specific operation (for example, an operation of pressing a specific button) with respect to the monitoring terminal apparatus 50 during operation, content at the time of the operation by the operator can be added to (registered into) these pre-indicator judgment tables. There are cases in which the above-noted pre-indicator judgment tables are created using HAZOP (Hazard and Operability Study) results and the like.

(Data Extraction Unit 43)

As described above, when the state change judgment unit 42 judges that there is a pre-indicator that the state of the plant will change, the data extraction unit 43 extracts data associated with the state quantities that are the basis of the judgment in which a status change has occurred. For example, the data extraction unit 43 extracts data considering the following exemplary conditions:
HOZAP information;
Design information;
Diagnosis information of field devices 10 or the like;
Operating state information (including environmental information such as weather);
Control state information;
Non-static tasks and maintenance information; and
Operation experience rules.

Figure 8A:
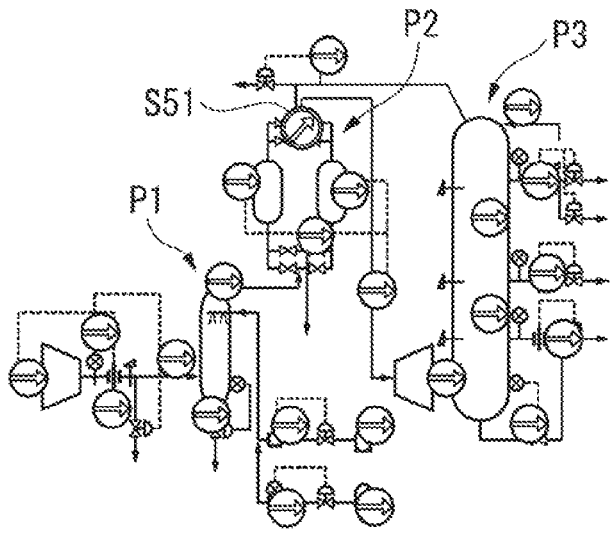
FIG. 8A is a first drawing for describing an example of the data extraction processing in an embodiment of the present invention.
Figure 8B:
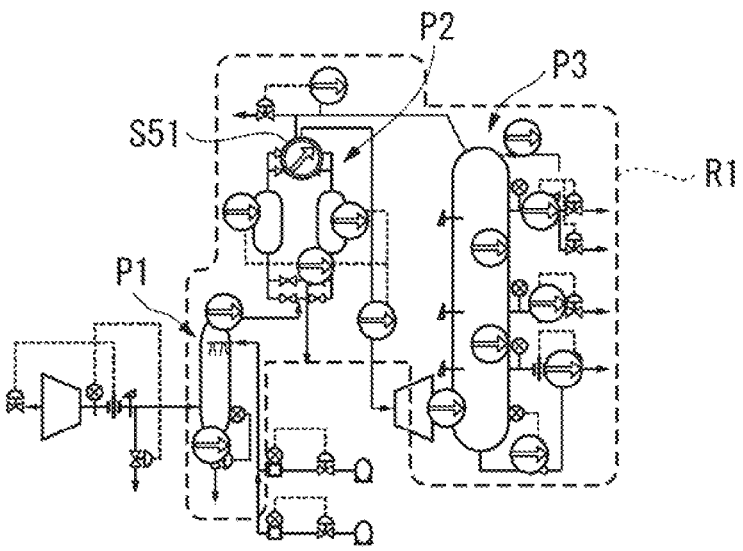
FIG. 8B is a second drawing for describing an example of the data extraction processing in an embodiment of the present invention.
Figure 8C:
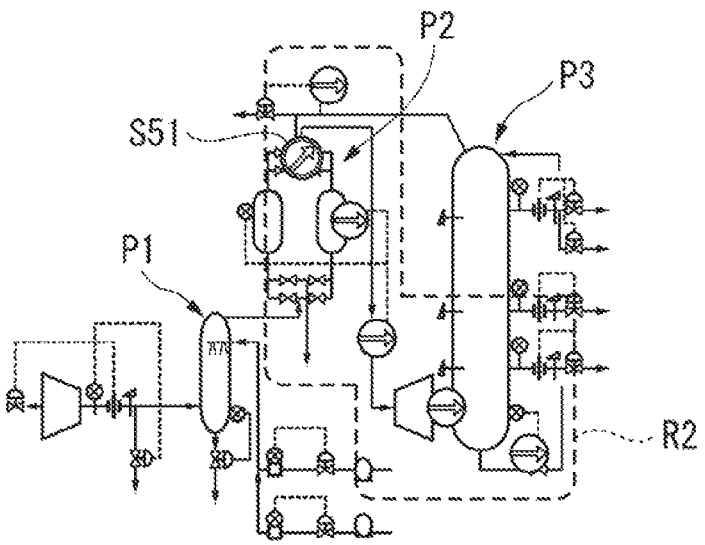
FIG. 8C is a third drawing for describing an example of the data extraction processing in an embodiment of the present invention.

FIG. 8A to FIG. 8C describe an example of data extraction processing in an embodiment of the present invention. In this case, to facilitate understanding, the case described is one in which an apparatus P1 performing an upstream process, an apparatus P2 performing a midstream process, and an apparatus P3 performing a downstream process are provided in the plant. The description is for the case in which, as shown in FIG. 8A, the status S51 indicating the pressure in the apparatus P2 changes from the status indicating "constant" to the status indicating "gradual increase," and the state change judgment unit 42 has judged that there is a pre-indicator that the state of the apparatus P2 will change.

Upon making the above-noted judgment, first the data extraction unit 43, based on the above-noted design information, extracts data related to the apparatus P2 with regard to which the judgment was made that a pre-indicator of a change of state exists, the apparatus P1 positioned at an upstream process and the apparatus P3 positioned at a downstream process, respectively, from the apparatus P2. When this is done, based on the above-noted maintenance information, extraction processing is done excluding data regarding a field device 10 that is under maintenance. This processing, for example, extracts data in the range indicated by the broken line marked R1 in FIG. 8B.

Next, the data extraction unit 43, based on the above-noted control state information, extracts data having a large control variation and data having large variation in the controlled quantities up until approximately several hours ago. Along with this, the data extraction unit 43, based on the above-noted operating state information, extracts the locations at which apparatus P1, P2, and P3 alarms have occurred, and data having many manual adjustments for approximately the past several hours. This processing narrows down the data within the range R1 shown in FIG. 8B to the data within the range R2 shown in FIG. 8C. Then, finally, the data extraction unit 43, based on the work history, extracts log information regarding the apparatuses P1, P2, and P3 within the range of R2 shown in FIG. 8C, for approximately the past several hours. The data extraction method described above is strictly exemplary, and an arbitrary method capable of extracting information usable by the operator in taking action in the case of a change in the state of a plant may be used.

(Details of the Monitoring Terminal Apparatus)

Next, the content displayed by the monitoring terminal apparatus 50 will be described in detail. FIG. 9A to FIG. 9D show examples of the content displayed by the monitoring terminal apparatus in an embodiment of the present invention. As shown in FIG. 9A, a graphic window W1 (hereinafter "overview window W1") that displays the statuses classified by the trend calculation unit 41 of the application server 40, along with the outer appearances of apparatuses provided in the plant is displayed on the monitoring terminal apparatus 50.

In the examples shown in FIG. 9A, the statuses shown in the overview window W1 are displayed as follows, in accordance with the types thereof (refer to FIG. 9B). Although, as a convenience in representation in the drawings, these are shown as white-on-black arrows and black arrows, depending on the status, representation may be done using color-coding.

"Constant" is represented by a right-directed white-on-black arrow.

"Gradual increase" is represented by a white-on-black arrow directed to the upper right.

"Gradual decrease" is represented by a white-on-black arrow directed to the lower right.

"Sudden increase" is represented by a black arrow directed to the upper right (larger slope than "gradual increase").

"Sudden decrease" is represented by a black arrow directed to the lower right (larger slope than "gradual decrease").

If the variation trend Dv of a state quantity is numerically displayed, the operator needs to make a detailed consideration of the size of the value and recognize the variation trend Dv. In contrast, if the status of a state quantity is displayed graphically by an arrow display, the operator can intuitively recognize the variation trend Dv from the direction and color of the arrow. For this reason, by just glancing at the overview display window W1 shown in FIG. 9A, it is possible in a short time to grasp the status of each state quantity. Also, graphically displaying the status of each state quantity together with the outer appearance of apparatuses provided in the plant facilitates recognition of the association with each state quantity.

The status display example shown in FIG. 9B describes the case in which the size of the inclination of the arrows represents the types of statuses. In place of the display example shown in FIG. 9B, however, the display examples shown in FIG. 9C or FIG. 9D may be used. In the status display example shown in FIG. 9C, the size of the inclination of the arrows represents the type of status, and the time interval (Δt) over which the variation trend Dv was determined is represented by the length of the broken line arrow. In the status display example shown in FIG. 9D, the size of the inclination of the arrows represents the type of status, and the position of the arrows within the measurement range represents the current value of the state quantities. To facilitate the recognition of the status by the operator, color-coded display for each status type may be used, or the status indicating "constant" may not be displayed.

Figure 10A:
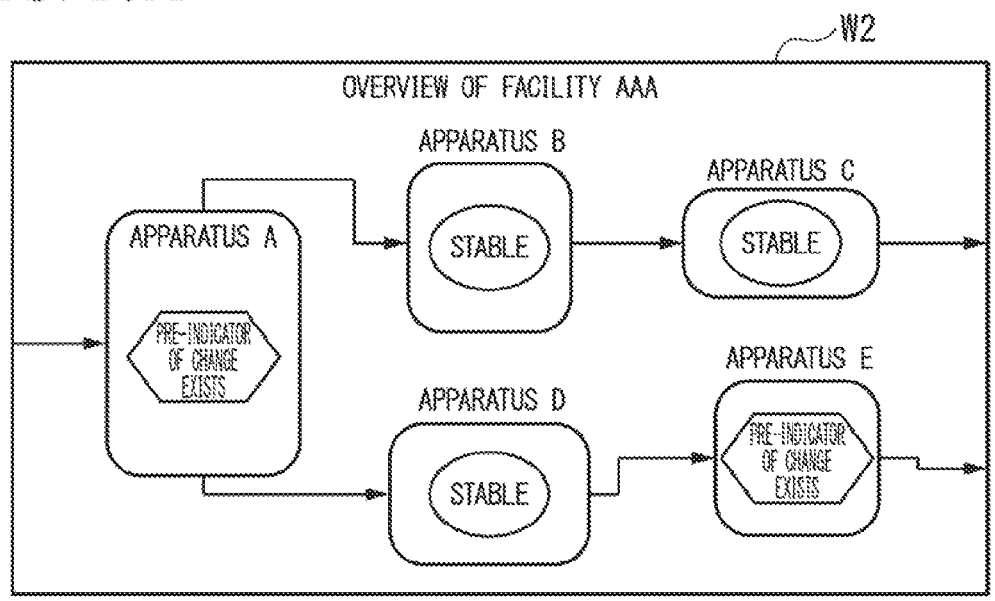
FIG. 10A is a first drawing showing another example of the display content of a monitoring terminal apparatus in an embodiment of the present invention.
Figure 10B:
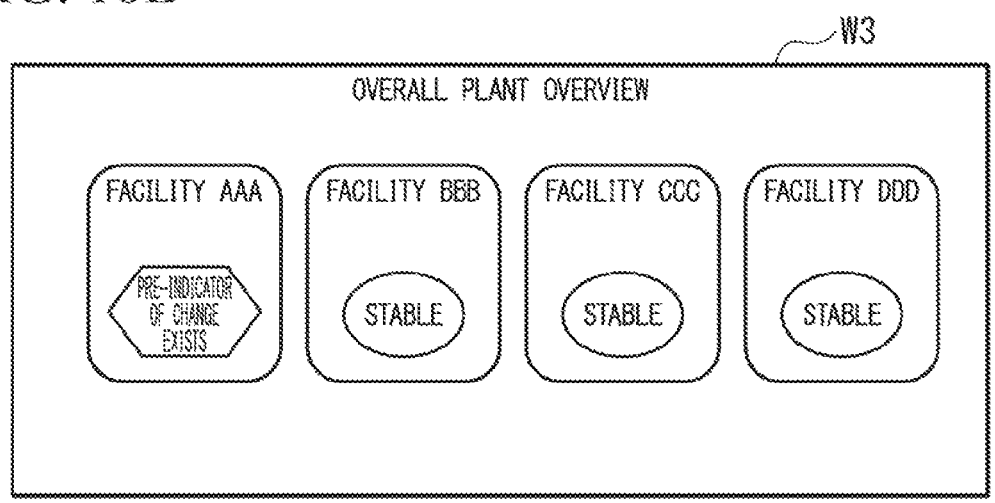
FIG. 10B is a second drawing showing another example of the display content of a monitoring terminal apparatus in an embodiment of the present invention.

FIG. 10A and FIG. 10B show another example of the display content on the monitoring terminal apparatus in an embodiment of the present invention. As shown in FIG. 10A, the monitoring terminal apparatus 50 can display a window W2 (hereinafter "facility overview window W2") displays the statuses for each apparatus provided in the plant in units of facilities. As shown in FIG. 10B, the monitoring terminal apparatus 50 can display a window W3 (hereinafter "plant overview window W3") displaying the statuses for each facility provided in the plant, with the overall plant taken as the unit.

Other than the case in which the monitoring of the plant is done in units of individual apparatuses, there is the case in which monitoring is done in units of facilities constituted by a plurality of apparatuses provided in the plant, and the case in which monitoring is done with the overall plant as the unit. To do this, the monitoring terminal apparatus 50 can display the facility overview window W2 shown in FIG. 10A and the plant overview window W3 shown in FIG. 10B.

The facility overview window W2 shown in FIG. 10A displays, in process step sequence, a plurality of apparatuses provided in a given facility, along with the statuses of each of the apparatuses. As a result, by just glancing at the facility overview window W2, the operator can quickly and easily gasp the statuses of a plurality of apparatuses provided in a facility and the relationship therebetween. The plant overview window W3 shown in FIG. 10B displays the statuses of a plurality of facilities provided in the plant. As a result, by just glancing at the plant overview window W3, the operator can quickly and easily gasp the overall situation in the plant.

Figure 11A:
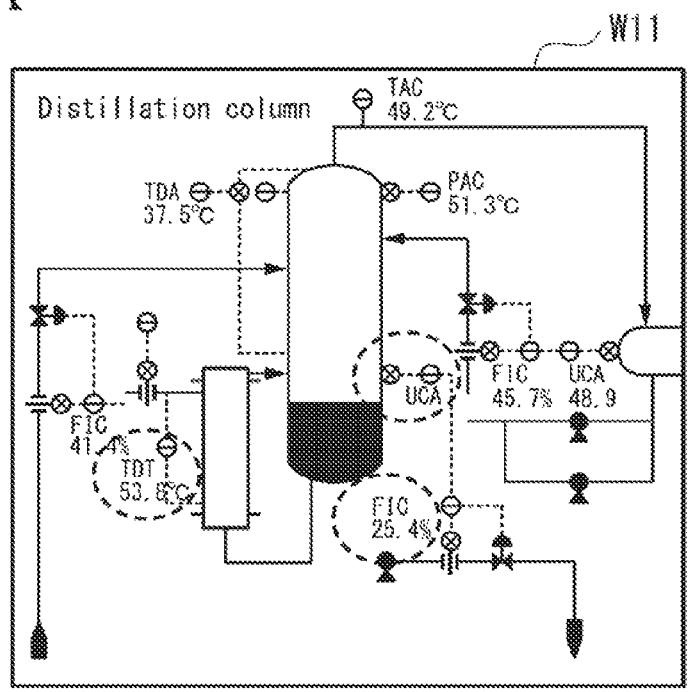
FIG. 11A is a first drawing showing a display example of extracted data in an embodiment of the present invention.
Figure 11B:
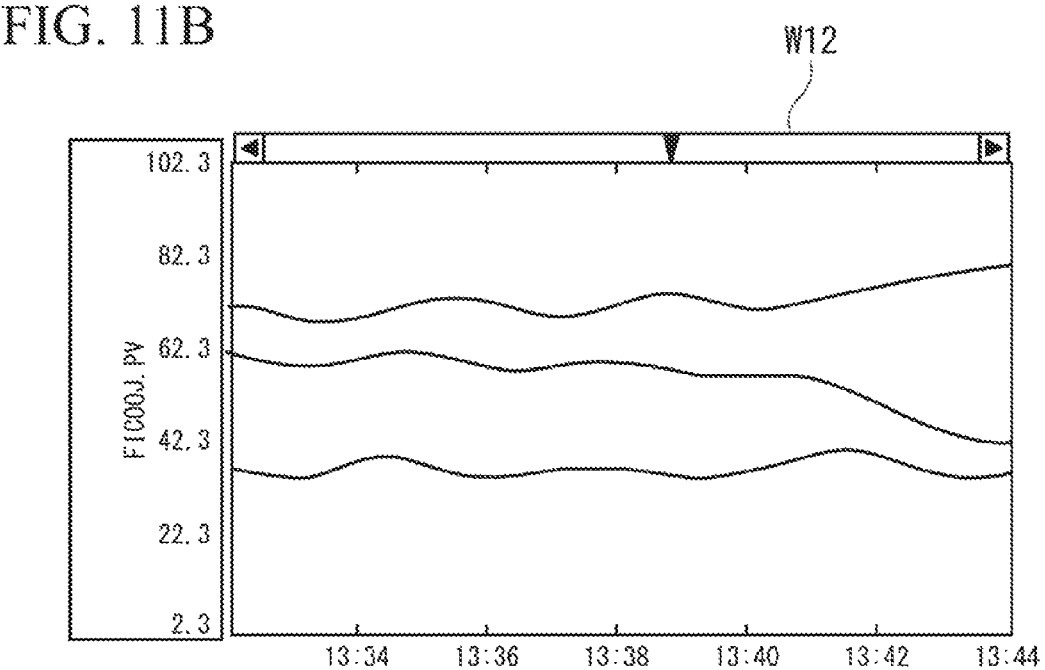
FIG. 11B is a second drawing showing a display example of extracted data in an embodiment of the present invention.

The monitoring terminal apparatus 50 can also display data extracted by the data extraction unit 43 of the application server 40. FIG. 11A and FIG. 11B show examples of data extracted in an embodiment of the present invention. The window W11 shown in FIG. 11A displays the positions at which data related to state quantities exhibiting a change in status was obtained. The window W12 shown in FIG. 11B shows a graph (trend graph) of the time variations of data related to state quantities exhibiting a change in status.

The window W11 shown in FIG. 11A and the window W12 shown in FIG. 11B are pop-up windows appearing in the case in which, in the condition in which the overview window W1 shown in FIG. 9A is displayed, a status displayed within the overview window W1 has changed. If data has been extracted by the data extraction unit 43 of the application server 40, the content displayed on the monitoring terminal apparatus 50 is not restricted to the content displayed in the windows W11 and W12, but may be process flow diagrams, information on actions to be taken, or the like.

Figure 12:
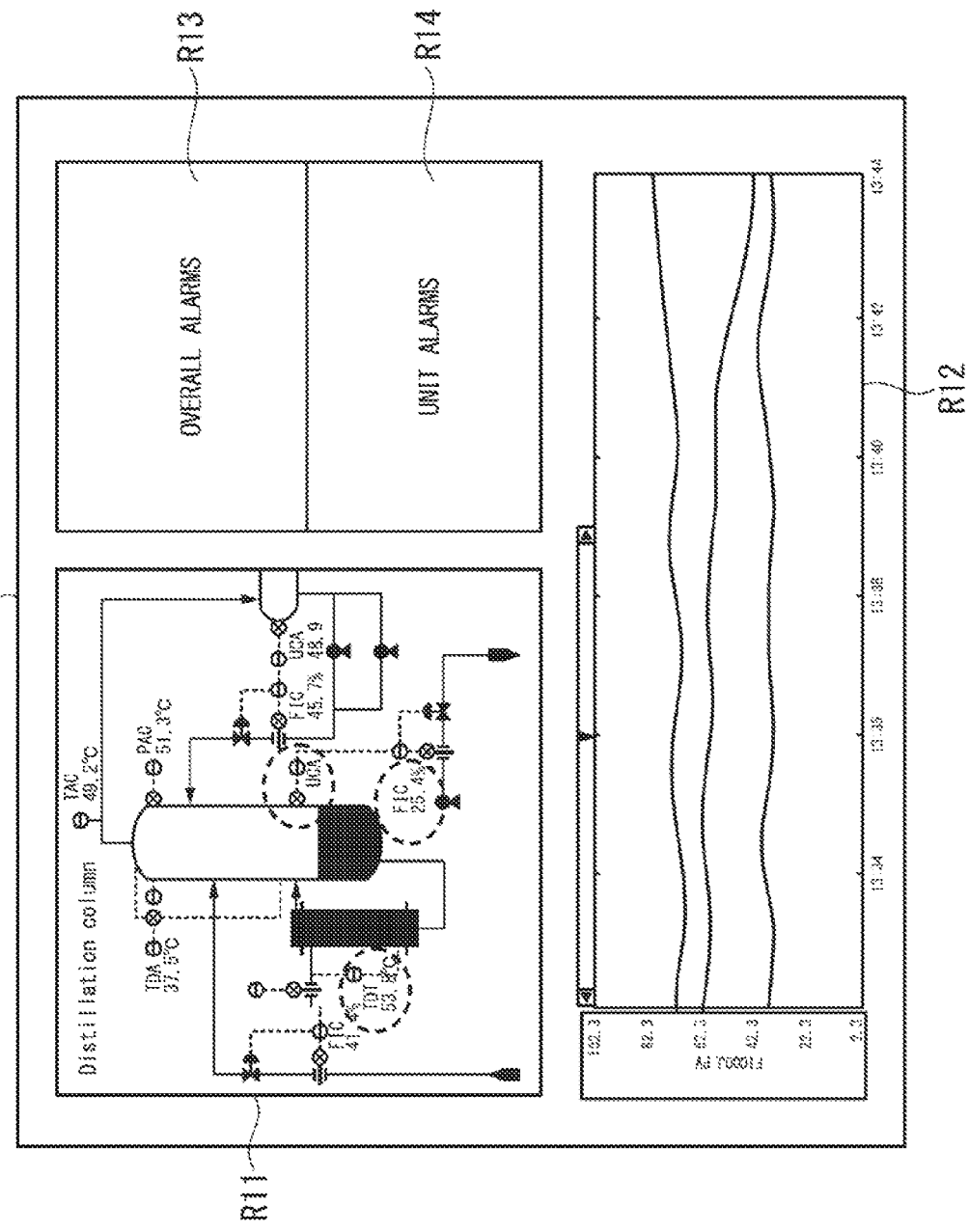
FIG. 12 is a drawing showing another display example of extracted data in an embodiment of the present invention.

The content displayed in the windows W11, W12, and the like may be displayed together in a single window. FIG. 12 shows another display example of data extracted in an embodiment of the present invention. The window W20 shown in FIG. 12 displays a region R11 showing the display content of the window W11 in FIG. 11A, a region showing the display content of the window W12 shown in FIG. 11B, a region R13 that displays the display content of overall plant alarms, and a region R14 that displays the content of each alarm of each unit (for example facility). Because the window W20 shown in FIG. 12 collects the data extracted by the application server 40 onto the display of the single window W20, the operator can easily grasp information necessary for taking action when the plant state changes.

Figure 13A:
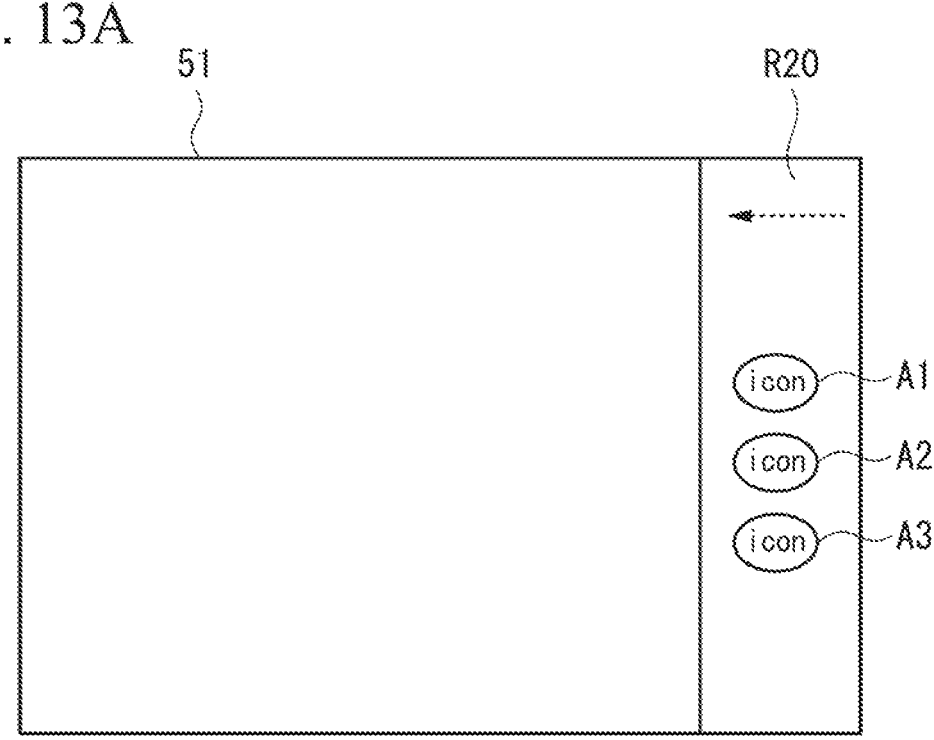
FIG. 13A is a first drawing showing yet another display example of extracted data in an embodiment of the present invention.
Figure 13B:
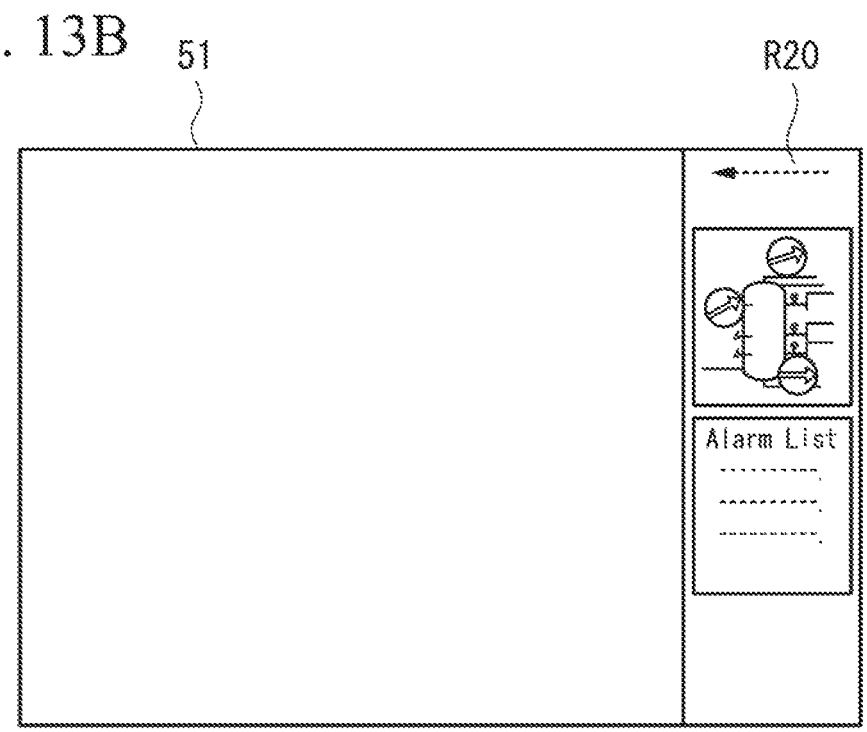
FIG. 13B is a second drawing showing yet another display example of extracted data in an embodiment of the present invention.

Alternatively, a display region may be provided on a part of the display screen of the monitoring terminal apparatus 50 for extracted data (or icons for displaying extracted data), so that extracted data and the like extracted by the data extraction unit 43 of the application server 40 can be displayed. FIG. 13A and FIG. 13B show other examples of displays of extracted data in an embodiment of the present invention. As shown in FIG. 13A and FIG. 13B, a display region R20 displaying extracted data and the like is displayed, for example, on the right edge part of the display screen 51 of the monitoring terminal apparatus 50. The display region R20 automatically appears each time extracted data is sent from the application server 40.

In the example shown in FIG. 13A, icons A1 to A3 for displaying the windows W11, W12, and the like shown in FIG. 11A and FIG. 11B are displayed in the display region R20. When the operator makes an operation that specifies any one of the icons A1 to A3, the window W11 shown in FIG. 11A or the window W12 shown in FIG. 11B is displayed on the display screen 51. In the example shown in FIG. 13B, the content of the extracted data is displayed reduced (in a thumbnail display) in the display region 51. The specified extracted data may be displayed enlarged in the window if the operator makes an operation to specify extracted data that is displayed in reduced form in the display region 51.

As described above, in the present embodiment, in the application server 40, a variation trend Dv of a state quantity in an industrial process is determined, the status is classified, and, in accordance with the existence or non-existence of a change in the classified status, a judgment is made as to the existence or non-existence of a pre-indicator that the state of the plant will change, the status classified by the application server 40 and the results of the above-noted judgment being displayed on the monitoring terminal apparatus 50. As a result, even if the information obtained in the plant becomes diverse and large in quantity, it is possible, while reducing the burden on the operator, to achieve high-accuracy and high-efficiency process control.

When a judgment is made that a pre-indicator that the plant state will change exists, data extracted by the application server 40 (data related to the state quantity exhibiting a change in status) is displayed on the monitoring terminal apparatus 50. As a result, if the state of the plant changes, the operator can, based on the content displayed on the monitoring terminal apparatus 50, take appropriate action, thereby enabling high-accuracy and high-efficiency process control.

Although the foregoing has been a description of a process monitoring system, apparatus, and method according to an embodiment of the present invention, the present invention is not restricted to the above-described embodiment, and can be freely modified within the scope thereof. For example, whereas the above-noted embodiment has been described for the example in which the state quantity statuses are individually displayed by arrows, the statuses of a plurality of state quantities may be displayed on a radar chart, as shown in FIG. 14.

Figure 14:
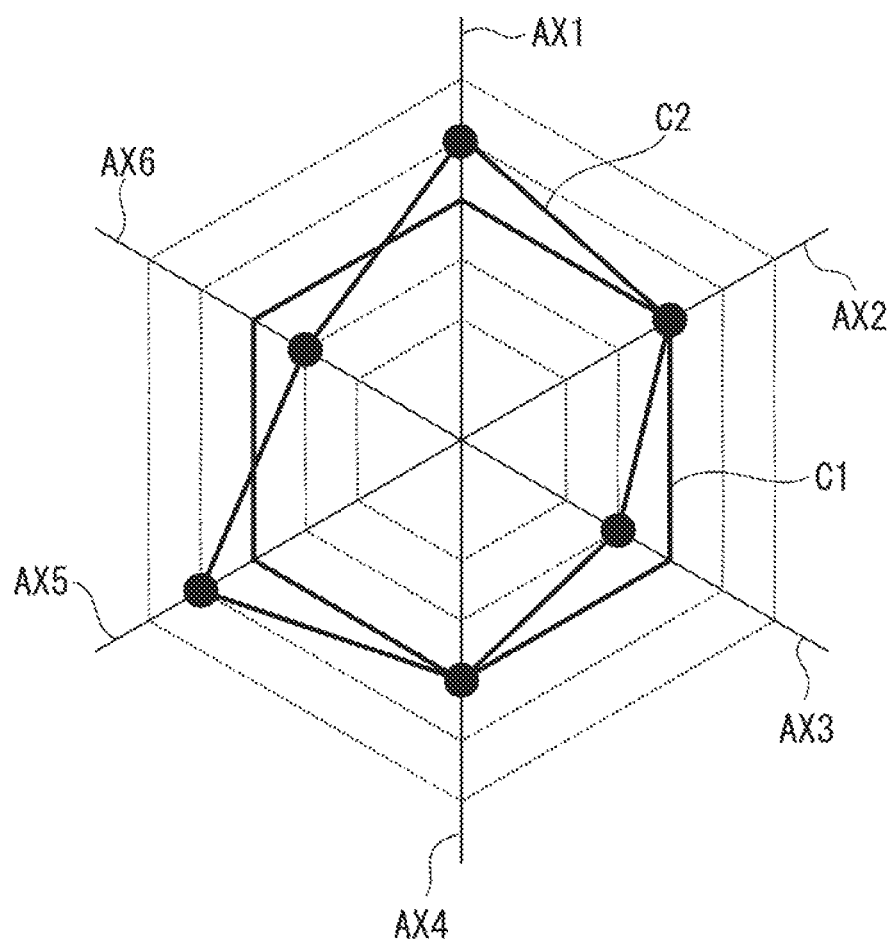
FIG. 14 is a drawing showing another display example of the status in an embodiment of the present invention.

FIG. 14 shows another example of display of statuses in an embodiment of the present invention. As shown in FIG. 14, a plurality of state quantities (six state quantities in the example shown in FIG. 14) are allocated to the axes AX1 to AX6 of a radar chart, and a status taken as a reference for each of the state quantities (for example "constant") is allocated to the center points of each of the axes AX1 to AX6. By doing this, for example if all of the statuses of the six state quantities are "constant," the regular hexagon radar chart C1 shown in FIG. 14 is displayed. If the status of one of the six state quantities changes from "constant," for example, a deformed radar chart C2, as shown in FIG. 14, will be displayed, thereby enabling quick and easy grasping of the status change.

Also, although the foregoing embodiment has been described for the example in which only the variation trend Dv is calculated from the time-sequence data Cv, a further variation trend Pv of the variation trend Dv may be determined. However, similar to the case of determining the variation trend Dv from the time-sequence data Cv, the time variation of the variation trend Dv is considered and a variation trend Pv similar to one that would be visually sensed by a human is determined. By determining a variation trend Pv such as this, for example, monitoring is facilitated when the flow amount or temperature is to be increased by a fixed ratio.

In the above-noted embodiment, the description was of the case in which the overview window W1 displayed on the monitoring terminal apparatus 50, as shown in FIG. 9A, displays the outer appearances of apparatuses provided in the plant, along with the classified statuses. However, a variation trend of a control value may be determined and statuses classified, the statuses of the state quantities and the statuses of the control values being displayed overlaid in the overview window W1. In this type of display, it is preferable to display statuses of state quantities and the statuses of the control values with mutually different colors.

Although in the above-noted embodiment, the description has been for the example in which the data server 30, the application server 40, and the monitoring terminal apparatus 50 are connected to the control network N2, these may be connected to the field network N1. Also, although the description of the above-noted embodiment has been for the example in which the data server 30, the application server 40, and the monitoring terminal apparatus 50 are each implemented as separate apparatuses, at least two of them may be implemented as a single apparatus. For example, the data server 30 and the application server 40 may be implemented as one apparatus, or all of the data server 30, the application server 40, and the monitoring terminal apparatus 50 may be implemented as one apparatus.

According to an embodiment of the present invention, based on time-sequence data output from each of the field devices, variation trends of state quantities are determined, statuses are classified, and, in accordance with the existence or non-existence of a change of status of at least one of the classified statuses, a judgment is made as to the existence or non-existence of a pre-indicator of a change in the state of the plant, and notification is made of this judgment result. As a result, even if the information obtained from the plant becomes diverse and large in quantity, an effect is achieved of making it possible to obtain information useful for achieving high-accuracy and high-efficiency process control, while reducing the burden on the operator.

In the present specification, words indicating directions, such as front, back, up, down, right, left, vertical, horizontal, down, lateral, column, and row are references to these directions in an apparatus according to an embodiment of the present invention. Thus, these terms used in the present specification should be interpreted relatively in the apparatus of the present invention.

The term "constituted" is used to refer to constituent elements, elements, and parts of a device including hardware and programmed software for executing functions.

Additionally, terms in the claims represented in the form of "means plus function" should encompass all structures that can be used to execute the functions included in the present invention.

The term "unit" is used to describe a component, section, or part of hardware and software constituted or programmed so as to execute a desired function. Although typical examples of hardware include devices and circuits, they are not restricted in this manner.

Although the foregoing has been a description and exemplary presentation with regard to a preferred embodiment of the present invention, this is strictly speaking exemplary of the present invention and should not be thought of as restrictive, additions, deletions, replacements, and other modifications within the scope of the present invention being possible. That is, the present invention is not restricted by the above-described embodiments, but rather is restricted by the scope of the attached claims.

The invention claimed is:

1. A process monitoring system comprising:
   a plurality of field devices configured to measure state quantities in an industrial process implemented in a plant;
   a storage which stores information;
   a hardware processor configured to:
      determine variation trends of the state quantities, based on time-sequence data output from each of the plurality of field devices, and classify each of the variation trends of the state quantities into one of a plurality of statuses including a constant status, an increasing status, and a decreasing status;
      judge, by using the information stored in the storage, whether a pre-indicator of a change in a plant state exists or whether the pre-indicator of the change in the plant state does not exist, the judgment being made based on:
  a change in the classified status for at least one of the state quantities measured by at least one of the plurality of field devices;
  a current value of the at least one of the state quantities being at an upper position or a lower position relative to a target position within a range bounded by an upper limit position and a lower limit position for the at least one of the state quantities; and
  the status of the change in the classified status relative to the target position; and
control generation of an alarm regarding the at least one of the plurality of field devices measuring the at least one of the state quantities resulting in the judgment being made of the pre-indicator of the change in the plant state exists,
wherein the storage stores, as the information:
  the upper limit position;
  the lower limit position;
  the target position;
  the classified statuses for the state quantities; and
  the current value of the at least one of the state quantities.

2. A process monitoring system comprising:
a plurality of field devices configured to measure state quantities in an industrial process implemented in a plant;
a storage which stores information;
a hardware processor configured to:
  determine variation trends of the state quantities, based on time-sequence data output from each of the plurality of field devices, and classify each of the variation trends of the state quantities into one of a plurality of statuses including a constant status, an increasing status, and a decreasing status; and
  judge, by using the information stored in the storage, whether a pre-indicator of a change in a plant state exists or whether the pre-indicator of the change in the plant state does not exist, the judgment being made based on a relationship between an operating mode set for the plant and the classified status for each of at least two of the state quantities respectively measured by at least two of the plurality of field devices; and
  control generation of an alarm regarding the at least two of the plurality of field devices measuring the at least two of the state quantities resulting in the judgment being made of the pre-indicator of the change in the plant state exists,
wherein the storage stores, as the information, relationships between:
  the pre-indicator;
  the change in the classified status;
  the operating mode; and
  the classified statuses for the state quantities.

3. The process monitoring system according to claim 1, further comprising a display device configured to display the classified status for the at least one of the state quantities.

4. The process monitoring system according to claim 1, wherein the hardware processor is further configured to extract data related to the at least one of the plurality of field devices measuring the at least one of the state quantities resulting in the judgment being made of the pre-indicator of the change in the plant state exists.

5. The process monitoring system according to claim 1, wherein the hardware processor is further configured to determine the variation trends by determining a slope of time-sequence data output from each of the plurality of field devices.

6. The process monitoring system according to claim 5, wherein a length of a time period for determining the slope of the time-sequence data differs depending upon a type of a state quantity.

7. The process monitoring system according to claim 1, wherein the hardware processor is further configured to determine the variation trends by using at least one of:
  a process to determine a piecewise moving average;
  a process to determine a linear approximation by a least squares method; and
  a statistical process to determine a standard deviation or a variance.

8. The process monitoring system according to claim 1, wherein at least one of the state quantities indicates a characteristic of at least one of odor, flame shape, and smoke color.

9. The process monitoring system according to claim 4, wherein the hardware processor is further configured to extract data related to apparatuses positioned in at least an upstream process and a downstream process relative to at least one of the plurality of field devices having measured the state quantity that has exhibited a status change.

10. The process monitoring system according to claim 3, wherein the display device is further configured to display the classified statuses in association with an outer appearance of an apparatus provided in the plant.

11. The process monitoring system according to claim 3, wherein the display device is further configured to display an arrow having a magnitude of a slope angle which represents a type of one of the statuses.

12. The process monitoring system according to claim 11, wherein the display device is further configured to display the arrow having a length that represents a time interval to be used for determining the variation trends.

13. The process monitoring system according to claim 11, wherein the display device is further configured to display the arrow having a position in a measurement range, the position representing a current value of one of the state quantities.

14. The process monitoring system according to claim 3, wherein the display device is further configured to display a radar chart representing the classified statuses.

15. The process monitoring system according to claim 1, wherein the hardware processor is further configured to determine a further variation trend to each of the variation trends of the state quantities, the determination being made based on the time-sequence data output from each of the plurality of field devices.

16. The process monitoring system according to claim 1, wherein the plurality of the classified statuses are obtained at a same time.

17. The process monitoring system according to claim 1, wherein the hardware processor is configured to judge that the pre-indicator of the change in the plant state does not exist when the status of the change in the classified status is increasing or decreasing towards the target position.

18. A process monitoring apparatus comprising:
a storage which stores information; and
a hardware processor configured to:
  determine variation trends of state quantities and classify each of the variation trends of the state quantities into one status of a plurality of statuses including a constant status, an increasing status, and a decreasing status, the determination being made based on time-sequence data output from each of a plurality of field devices for measuring the state quantities in an industrial process implemented in a plant;
judge, by using the information stored in the storage, whether a pre-indicator of a change in a plant state exists or whether the pre-indicator of the change in the plant state does not exist, the judgment being made based on:
a change in the classified status for at least one of the state quantities measured by at least one of the plurality of field devices:
a current value of the at least one of the state quantities being at an upper position or a lower position relative to a target position within a range bounded by an upper limit position and a lower limit position for the at least one of the state quantities: and
the status of the change in the classified status relative to the target position; and
control generation of an alarm regarding the at least one of the plurality of field devices measuring the at least one of the state quantities resulting in the judgment being made of the pre-indicator of the change in the plant state exists,
wherein the storage stores, as the information:
the upper limit position;
the lower limit position;
the target position;
the classified statuses for the state quantities; and
the current value of the at least one of the state quantities.

19. A process monitoring method comprising:
collecting time-sequence data output from each of a plurality of field devices measuring state quantities in an industrial process implemented in a plant;
storing information in a storage;
determining a variation trend of the state quantities, and classifying the variation trends of the state quantities into one of a plurality of statuses including a constant status, an increasing status, and a decreasing status, the determination being made based on the collected time-sequence data;
judging, by using the information stored in the storage, whether a pre-indicator of a change in a plant state exists or whether the pre-indicator of the change in the plant state does not exist, the judgment being made based on:
a change in the classified status for at least one of the state quantities measured by at least one of the plurality of field devices:
a current value of the at least one of the state quantities being at an upper position or a lower position relative to a target position within a range bounded by an upper limit position and a lower limit position for the at least one of the state quantities: and
the status of the change in the classified status relative to the target position; and
controlling generation of an alarm regarding the at least one of the plurality of field devices measuring the at least one of the state quantities resulting in the judgment being made of the pre-indicator of the change in the plant state exists,
wherein the storage stores, as the information:
the upper limit position;
the lower limit position;
the target position;
the classified statuses for the state quantities; and
the current value of the at least one of the state quantities.

20. The process monitoring system according to claim 2, wherein the judgment is made using a table that sets forth relationships between different combinations of the statuses regarding the state quantities and plant states.

21. A process monitoring apparatus comprising:
a storage which stores information; and
a hardware processor configured to:
determine variation trends of state quantities and classify each of the variation trends of the state quantities into one status of a plurality of statuses including a constant status, an increasing status, and a decreasing status, the determination being made based on time-sequence data output from each of a plurality of field devices for measuring the state quantities in an industrial process implemented in a plant;
judge, by using the information stored in the storage, whether a pre-indicator of a change in a plant state exists or whether the pre-indicator of the change in the plant state does not exist, the judgment being made based on a relationship between an operating mode set for the plant and the classified status for each of at least two of the state quantities respectively measured by at least two of the plurality of field devices; and
control generation of an alarm regarding the at least two of the plurality of field devices measuring the at least two of the state quantities resulting in the judgment being made of the pre-indicator of the change in the plant state exists,
wherein the storage stores, as the information, relationships between:
the pre-indicator;
the change in the classified status;
the operating mode; and
the classified statuses for the state quantities.

22. A process monitoring method comprising:
collecting time-sequence data output from each of a plurality of field devices measuring state quantities in an industrial process implemented in a plant;
storing information in a storage;
determining a variation trend of the state quantities, and classifying the variation trends of the state quantities into one of a plurality of statuses including a constant status, an increasing status, and a decreasing status, the determination being made based on the collected time-sequence data;
judging, by using the information stored in the storage, whether a pre-indicator of a change in a plant state exists or whether the pre-indicator of the change in the plant state does not exist, the judgment being made based on a relationship between an operating mode set for the plant and the classified status for each of at least two of the state quantities respectively measured by at least two of the plurality of field devices; and
controlling generation of an alarm regarding the at least two of the plurality of field devices measuring the at least two of the state quantities resulting in the judgment being made of the pre-indicator of the change in the plant state exists,
wherein the storage stores, as the information, relationships between:
the pre-indicator;
the change in the classified status;

the operating mode; and
the classified statuses for the state quantities.

* * * * *